Patented July 22, 1941

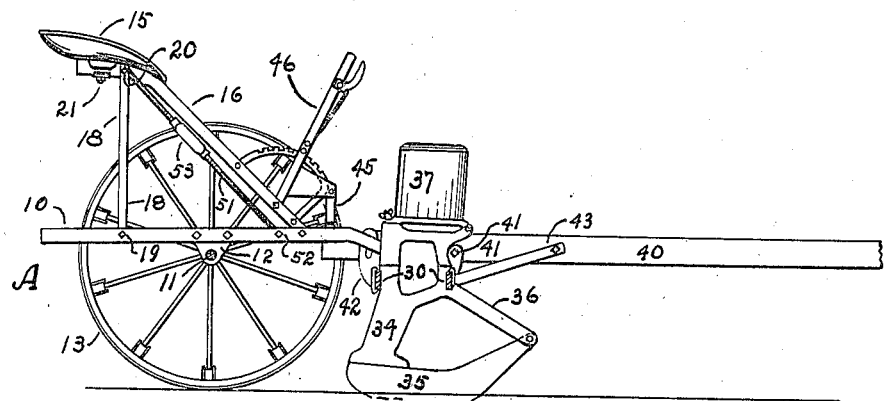

2,250,312

UNITED STATES PATENT OFFICE 2,250,312

PLANTER FRAME AND ADJUSTING MEANS THEREFOR

Clement W. Michael, Racine, Wis., assignor to The Massey-Harris Company, Racine, Wis., a corporation of Maryland Application April 13, 1940, Serial No. 329,504

5 Claims. (Cl. 97—236)

The present invention relates to the conventional type of corn planter having a main frame and supporting wheels on opposite sides thereof and a narrow transverse frame pivotally mounted on the front end of the main frame, the transverse frame having longitudinally extending, centrally positioned supporting means and other appurtenances which are usual in planters of the type.

In planters of the type, the runners are spaced apart at whatever distance the rows are desired and the wheels are positioned on the axle so they follow the runners and act to press the soil over the seed planted.

One of the disadvantages inherent in planters of the type is brought about by the fact that the forward end of the main frame and the transverse frame are supported either by a pole or other means which are transversely centrally positioned. The frames are inherently weak and since they are supported from three points, the transverse frame is not held rigidly in parallel relation to the axle, therefore the runners seldom penetrate the soil at the same depth.

An effort has been made in the past to remedy the inherent trouble in conventional planters by mounting a gauge wheel on each of the runners. This, however, is not satisfactory because convenient means cannot be provided for changing the depth of the runners. For example, in passing over a portion of the field having light soil, it may be desired to plant considerably deeper than when passing over heavier soil in some other part of the field. Therefore it is desired that the depth of the runners at all times be under the immediate control of the operator, preferably through a single lever.

When one runner is inclined to penetrate deeper, the other runner moves out of the soil accordingly because the transverse frame is largely supported at its center and the main frame is not rigid enough to prevent this twisting movement. Clearly it is apparent that a conventional corn planter possesses an inherent defect and one which is not easily overcome. The cost of a frame having sufficient strength to prevent torsional movement would be prohibitive.

I provide means at a very low cost to eliminate the inherent weakness of planters of the type and at the same time provide means whereby the frame may be adjusted after it has been assembled in order to bring the runners in parallel alignment with the axle and permanently hold them in this position.

I accomplish the desired results without changing the structure of the planter in any way but by adding three braces as will hereinafter appear.

To these and other useful ends, my invention consists of parts, combinations of parts or their equivalents, as hereinafter described and claimed and shown in the accompanying drawing in which:

Figure 1 is a side elevational view of a conventional planter equipped with my invention, the near wheel being removed.

Figure 2 is a top plan view of the planter as shown in Figure 1 less the depth regulating lever and its connection to the transverse frame.

As thus illustrated, reference character A designates, in its entirety, a main frame and reference character B designates, in its entirety, a transverse frame. Numeral 10 designates the side and rear members of a frame and 11 designates a supporting axle being preferably rotatably mounted on the frame by means of bearings 12—12 and having mounted near their ends, wheels 13—13. Wheels 13 are adjustable longitudinally on axle 11 for purposes which will hereinafter appear.

I provide a transverse frame member 14 which acts to stiffen the frame and hold the front ends of the frame bars in spaced alignment. A seat 15 is provided for an operator and is slidably mounted on the horizontal rear ends of braces 16—16 as is the custom in planters of the type.

The forward ends of members 16 are secured to member 14 preferably as illustrated. These members are preferably positioned in spaced relation. I provide braces 18—18 which are secured to the frame as at 19—19, the braces converging and being secured to members 16 as at 20. Seat 15 is secured to members 16 by a suitable pad and a bolt 21.

Transverse frame B consists of spaced parallel bars 30—30 secured together at their ends by means of brackets 31—31, these brackets being provided with necessary appurtenances for operating the planting mechanism through a linked wire as is the custom in planters of the type.

Spaced brackets 32—32 are secured to members 30 and pivotally mounted on the forward ends of frame 10 as at 33—33. A pair of runner boots 34 is transversely adjustably mounted on members 30 as is the custom in planters of the type. These members carry runners 35, the forward ends being secured to the front member 30 by means of braces 36—36.

Hoppers 37—37 are mounted in any suitable manner on the top of boots 34. A pole 40 or an equivalent is provided and is adapted preferably to carry a double tree near its rear and a neck yoke at its front end. Thus when the planter is adapted to be pulled by a team of horses, pole 40 is secured to the forward frame member 30 by means of brackets 41—41, the rear member 30 being secured to the pole by brackets 42—42. These rear brackets are provided with a slotted opening so the runners may be tilted longitudinally as to their position relative to the pole.

It is the custom to provide pole braces 43 which are preferably secured to the transverse frame adjacent brackets 32. Brackets 41 may also be slotted similar to brackets 42 or they may be provided with a series of apertures so as to cooperate with brackets 42 for adjusting the angle of the runners relative to the pole.

I provide a bracket 44 on the rear end of the pole having a link 45 which is pivotally connected to a forward extension of lever 46. Assuming that the forward end of the pole is fixed in its height, the operator may manipulate this lever and change the depth of the planting or the depth runners 35 will penetrate the ground.

In some planters, it is the custom to provide a stub pole (not shown), for a connection to a tractor draw bar or to a depth wheel or fore truck (not shown). In either event, it will be seen by scrutinizing the drawing that unless some means is provided for preventing it, the depth of the two runners may not always be the same.

When the frame is first assembled, it may not, in fact generally does not, hold the runners at the same height relative to wheels 13. I provide means for stiffening the frame and for regulating the position of the runners in the following manner:

A brace 50 at one end is secured preferably to the rear end of the left side member of frame 10 and extends to the other side member to a point preferably near the axle and is secured thereto as illustrated in Figure 2. Thus the side members of the frame will be held from moving longitudinally relative to the each other.

I provide brace members 51—51, their forward ends being secured to the frame members preferably as at 52—52. Brace members 51 converge upwardly and rearwardly and are secured to members 16 at the point where members 18 are attached or directly in front of this position.

I provide means for adjusting the length of braces 51 preferably by means of turn buckles 53—53. It will be seen that in view of brace 50, supporting members 18, and members 14 and 16, that by adjusting the turn buckles 53, the sides of member 10 may be moved to and held in exactly the position required to maintain the runners 35 at the same height relative to the wheels.

Let it be assumed that when the planter has been assembled, it is found that the left hand runner is lower than the right hand runner. All that is necessary to remedy this is to tighten the left hand brace 51 and loosen the right hand brace. Thus it will be seen that the runners may be quickly and easily adjusted so they penetrate the soil at equal depths and when the adjustment is once made, the frame will hold them to this adjustment under all conditions of field work and that the operator may adjust the depth of the runners by manipulating the lever provided for the purpose.

Clearly I have provided adjusting and bracing means which may be applied to any planter of the class or to planters equipped with any style of transversely centrally positioned front supporting means. It will be understood that the adjusting means in one of braces 51 may be dispensed with and when the planter is pulled by a tractor, seat 15 may be dispensed with. Obviously many minor detail changes in the planter or bracing and adjusting means may be made without departing from the spirit and scope of my invention as recited in the appended claims.

Having thus shown and described the preferred form of my invention, I claim:

1. A planter of the class described, comprising a main frame having side members and transversely spaced carrying wheels mounted thereon a distance from the front ends thereof, a relatively narrow elongated transverse frame hingedly secured to the front end of said side members and having a single forwardly positioned carrying means midway its length, manually operated means associated with said frames and carrying means adapted to raise or lower said transverse frame, means for permanently locking said side members against forward or rearward movement relative to each other, a transverse brace member positioned between said side members near the front thereof, an operator's seat positioned in rear of the vertical plane of the axis of said wheels and a distance above said frame having a forwardly and downwardly extending brace secured to said transverse brace midway the length thereof, supporting brace members secured to said forwardly extending brace near its rear end each extending downwardly and outwardly, the lower ends secured to said side members, positioning members their rear ends secured to apexes formed by said supporting braces, their front ends being secured to said side members a distance ahead of the axis of said wheels, one or each of said positioning members having length adjusting means whereby the front ends of said side members may be adjusted to predetermined elevations relative to the axis of said wheels.

2. A planter of the class described, comprising a main frame having side and rear frame bar members, means adapted to hold the front ends of said frame side bar members in spaced relation, an axle having spaced carrying wheels mounted on said frame, upwardly and inwardly extending rear braces having their lower ends secured to the side bars of said frame and being secured together at their upper ends, upwardly and inwardly extending front braces secured at their lower ends to the side bars of said frame and a considerable distance from the lower first brace fastenings, their upper ends being secured to the upper ends of said rear braces, means on said frame adapted to hold said side frame bars from moving longitudinally relative to each other.

3. A device as recited in claim 2 including; at least one of said front braces having length adjusting means.

4. A device as recited in claim 2 including; a front frame bar member, a brace bar secured to the upper ends of said rear and front brace and extending forwardly and downwardly and being secured to said front frame bar.

5. A planter of the class described, comprising a main frame having side members and transversely spaced carrying wheels mounted thereon a distance from the front ends thereof, a relatively narrow elongated transverse frame hingedly secured to the front ends of said side members and having a forwardly extending carrying means midway its length, manually operated means associated with said frame and carrying means adapted to raise or lower said transverse frame, means for permanently locking said side members against forward or rearward movement relative to each other, means secured to said side members adapted to adjustably position the front ends of said frame at predetermined elevations relative to the axis of said wheels, said means for adjustably positioning the front ends of said side members comprising a transverse brace between the side members near the front ends thereof, an upwardly and rearwardly extending brace member secured to said transverse brace midway the length thereof and having brace members secured to its rear end, said last brace members extending downwardly and outwardly and being secured to said side members forming an apex anchoring point, positioning braces having their rear ends secured to said apex their front ends being secured to said side members a distance ahead of the axis of said wheels, one or each of said positioning members having length adjusting means whereby the front ends of said side members may be adjusted at predetermined elevations relative to the axis of said wheels.

CLEMENT W. MICHAEL.